(12) United States Patent
Hong

(10) Patent No.: US 9,657,730 B2
(45) Date of Patent: May 23, 2017

(54) HEAT DISSIPATION STRUCTURE OF TIRE REPAIR MACHINE

(75) Inventor: David Hong, Causeway Bay (HK)

(73) Assignee: ACTIVE TOOLS INTERNATIONAL (HK) LTD., Hong Kong (HK)

(*) Notice: Subject to any disclaimer, the term of this patent is extended or adjusted under 35 U.S.C. 154(b) by 177 days.

(21) Appl. No.: 13/608,103

(22) Filed: Sep. 10, 2012

(65) Prior Publication Data

US 2013/0228316 A1 Sep. 5, 2013

(30) Foreign Application Priority Data

Mar. 5, 2012 (TW) .............................. 101203944 A

(51) Int. Cl.
*F04B 39/06* (2006.01)
*B29C 73/16* (2006.01)
*B29L 30/00* (2006.01)
*F04D 25/08* (2006.01)

(52) U.S. Cl.
CPC .......... *F04B 39/066* (2013.01); *B29C 73/166* (2013.01); *F04D 25/082* (2013.01); *B29L 2030/00* (2013.01)

(58) Field of Classification Search
CPC .................................................... F04D 25/082
USPC ........................................ 417/234, 369, 372
See application file for complete search history.

(56) References Cited

U.S. PATENT DOCUMENTS

| | | | | |
|---|---|---|---|---|
| 2004/0018098 | A1* | 1/2004 | Beckman | F04B 39/066 417/234 |
| 2004/0125609 | A1* | 7/2004 | Gilligan | B60B 29/00 362/486 |
| 2007/0062512 | A1* | 3/2007 | Lazar | F24J 3/00 126/110 R |
| 2007/0066215 | A1* | 3/2007 | Song | B01D 46/0004 454/329 |
| 2008/0181794 | A1* | 7/2008 | Steinfels et al. | 417/234 |
| 2008/0187447 | A1* | 8/2008 | Steinfels | F04B 35/06 417/234 |
| 2010/0221134 | A1* | 9/2010 | Kanaizumi | F04C 18/0215 418/55.1 |
| 2011/0158828 | A1* | 6/2011 | Nutz | F04B 35/06 417/234 |

* cited by examiner

*Primary Examiner* — William H Rodriguez
*Assistant Examiner* — Christopher Brunjes

(57) ABSTRACT

The present invention discloses a heat dissipation structure of the tire repair machine, wherein, a positioning pedestal having at least one channel is provided inside the body, a channel inlet and a channel outlet are provided at the two ends of the channel respectively; a gas supply unit arranged inside the body comprises a motor and an air compressor driven by the motor, the motor is arranged at the rear of the positioning pedestal, such that the radial direction of a centrifugal fan connected with the drive shaft of the motor is directed to the channel inlet, while the air compressor is corresponding to the channel outlet; when the motor drives the air compressor to run, the air drawn in by the centrifugal fan can blow the air compressor via the channel, so as to perform heat dissipation for the air compressor.

6 Claims, 6 Drawing Sheets

HEAT DISSIPATION STRUCTURE OF TIRE REPAIR MACHINE

CROSS-REFERENCE TO RELATED APPLICATIONS

Pursuant to 35 U.S.C. 119(a), the instant application claims priority to prior Taiwan application number 101203944, filed Mar. 5, 2012.

FIELD OF THE INVENTION

The present invention relates to a heat dissipation structure, and particularly to an improved structure by means of windhole for guiding the airflow outside of the body into the body by use of a fan, so as to blow an air compressor to perform heat dissipation.

BACKGROUND OF THE INVENTION

The vehicle can not run after its tire ruptures and the tire pressure is lost. Such that, only the tire is replaced or repaired and then inflated, can the vehicle go on. Accordingly, the vehicle is generally equipped with a spare tire as required. However, the weight of the tire together with the rim will increase that of the vehicle body, and consequently increase the fuel consumption. This is neither economical nor environmental friendly. In order to reduce the vehicle load produced by one spare tire, a relative legerity tire repair machine is currently developed by manufacturers to provide for the drivers in the vehicle. When the tire is flat due to rupture, such tire repair machine can be used to repair and inflate the tire in emergency.

The known tire repair machine may also be used as a tire inflator, the structure thereof is composed of a sizing barrel and an air compressor provided in a housing, wherein, the sizing barrel and the air compressor are respectively connected with a sizing injection tube and an inflation tube, one end of the sizing injection tube and one end of the inflation tube are respectively provided with a sizing injection nozzle and an air intake nozzle. When used as a tire inflator, the air intake nozzle is combined to the air nozzle of the tire directly by the user. After that, the air compressor is powered on and high pressure air will be filled into the tire. When used as a tire repair machine, the sizing injection nozzle is firstly combined to the air nozzle of the tire. The pump is powered on to inject a proper quantity of sizing from the sizing barrel into the tire. Then the sizing injection nozzle is removed and alternatively the air intake nozzle is combined to the air nozzle of the tire. After that, the high pressure air is inflated to the tire to reach an appropriate tire pressure. After the air intake nozzle is removed, let the vehicle run a distance slowly, during running, the sizing can flow uniformly on the inner wall surface of the tire to fill up the position of the rupture. The solidified sizing can avoid gas leakage. Therefore, the driver can drive the vehicle to the nearest maintenance for further inspection.

The air compressor can generate heat during operation. In order to avoid a fault caused by overheating, effective heat dissipation is needed. Therefore, a general tire repair machine is provided with two heat dissipation fans inside the body to perform heat dissipation; wherein one is connected to a driving shaft of the motor and is driven by the motor which drives the air compressor synchronously, so as to perform heat dissipation on the motor; the other is connected to the motor via a gear mechanism or other linkage structure to operate synchronously, so as to perform heat dissipation on the air compressor.

The actual test and analysis show that, for the tire repair machine, two fans in one body are over many and unnecessary. In fact, only one fan which is arranged properly can replace the traditional two fans to dissipate heat effectively from the body.

SUMMARY OF THE INVENTION

An object of the present invention is to solve the known problem that, two heat dissipation fans are needed to perform heat dissipation for the motor and the air compressor respectively based on the existing poor heat dissipation structure of the tire repair machine, as a result the machine body can not be designed to be further exquisite, and the manufacturing cost is relatively high.

In the heat dissipation structure of the tire repair machine provided by the present invention, a positioning pedestal having at least one channel is provided inside the body, wherein a channel inlet and a channel outlet are provided at the two ends of the channel respectively; a gas supply unit arranged inside the body comprises a motor and an air compressor driven by the motor; the motor is arranged at the rear of the positioning pedestal, such that the radial direction of a centrifugal fan connected with the drive shaft of the motor is directed to the channel inlet, while the air compressor is corresponding to the channel outlet; when the motor drives the air compressor to run, the air drawn in by the centrifugal fan can blow the air compressor via the channel, so as to perform heat dissipation for the air compressor.

The heat dissipation structure of the tire repair machine provided by the present invention comprises a body, a positioning pedestal and a gas supply unit. In particular, the body has two or more ventilation holes. The positioning pedestal is arranged inside the body, wherein, the positioning pedestal is provided with a first inner room and a channel, a channel inlet and a channel outlet are provided at the two ends of the channel respectively, and the channel inlet is connected to the first inner room. The gas supply unit is arranged inside the body; wherein the gas supply unit comprises a motor and an air compressor driven by the motor. The motor is arranged inside the first inner room, and its drive shaft is provided with a centrifugal fan. Herein, the axial direction of the centrifugal fan is directed to the ventilation hole, the radial direction of the centrifugal fan is directed to the channel inlet, and the air compressor is corresponding to the channel outlet.

In the present invention, a tailgate is provided at the rear end of the body. The tailgate is provided with two or more ventilation holes. A filter is provided between the tailgate and the positioning pedestal. During the running of the centrifugal fan, the air is drawn in from outside of the body via the ventilation hole, and then passes through the filter; after that, it is leaded into the channel to blow the air compressor to perform heat dissipation for the air compressor. As the air flows through the channel, it can absorb the heat produced by the motor simultaneously to implement the heat dissipation effect on the motor.

The gas supply unit of the present invention comprises the motor and the air compressor, wherein, the motor is horizontally arranged, and the air compressor is vertically arranged. With aforesaid channel structure, a reasonable airflow path is achieved, and effective heat dissipation is realized.

BRIEF DESCRIPTION OF THE DRAWINGS

The present invention is described with reference to the accompanying drawings and embodiments. In the figures.

REFERENCE SIGN

Figure 1:
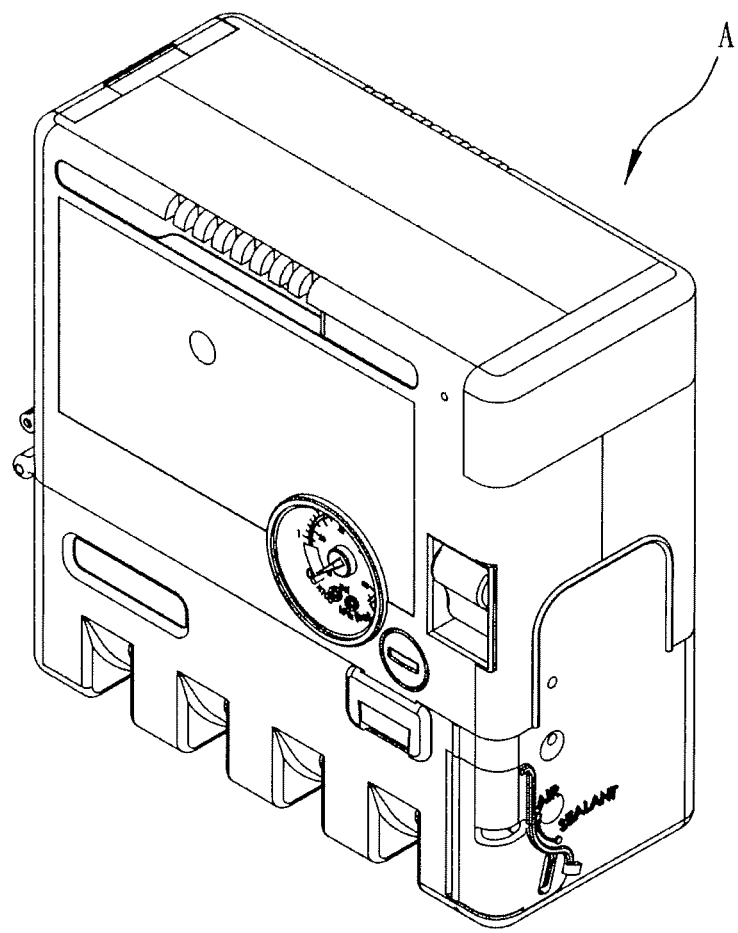
FIG. 1 is a stereograph illustrating an embodiment of the appearance structure of the present invention.

A Tire repair machine
1 Body
11A First upper housing
11B Second upper housing
12 Tailgate
121 Ventilation hole
13 Filter
14 Base
2 Positioning pedestal
21 First inner room
22 Second inner room
23 Channel
231 Channel inlet
232 Channel outlet
3 Gas supply unit
31 Motor
32. Air compressor
33 Gas distribution head
331 First outlet
332 Second outlet
4 Fan
5 Joint base
6 Sizing barrel
7 Inflation nozzle
8 Switch valve
9 Pressure gauge

DETAILED DESCRIPTION OF THE PREFERRED EMBODIMENT

Below the implementation of the present invention is explained in more detail in coordination with schemas and component symbols so that those skills familiar with this technology can practice the present invention after reading the specification.

The heat dissipation structure provided by the present invention is generally applied to the tire repair machine A shown in FIG. 1.

Figure 2:
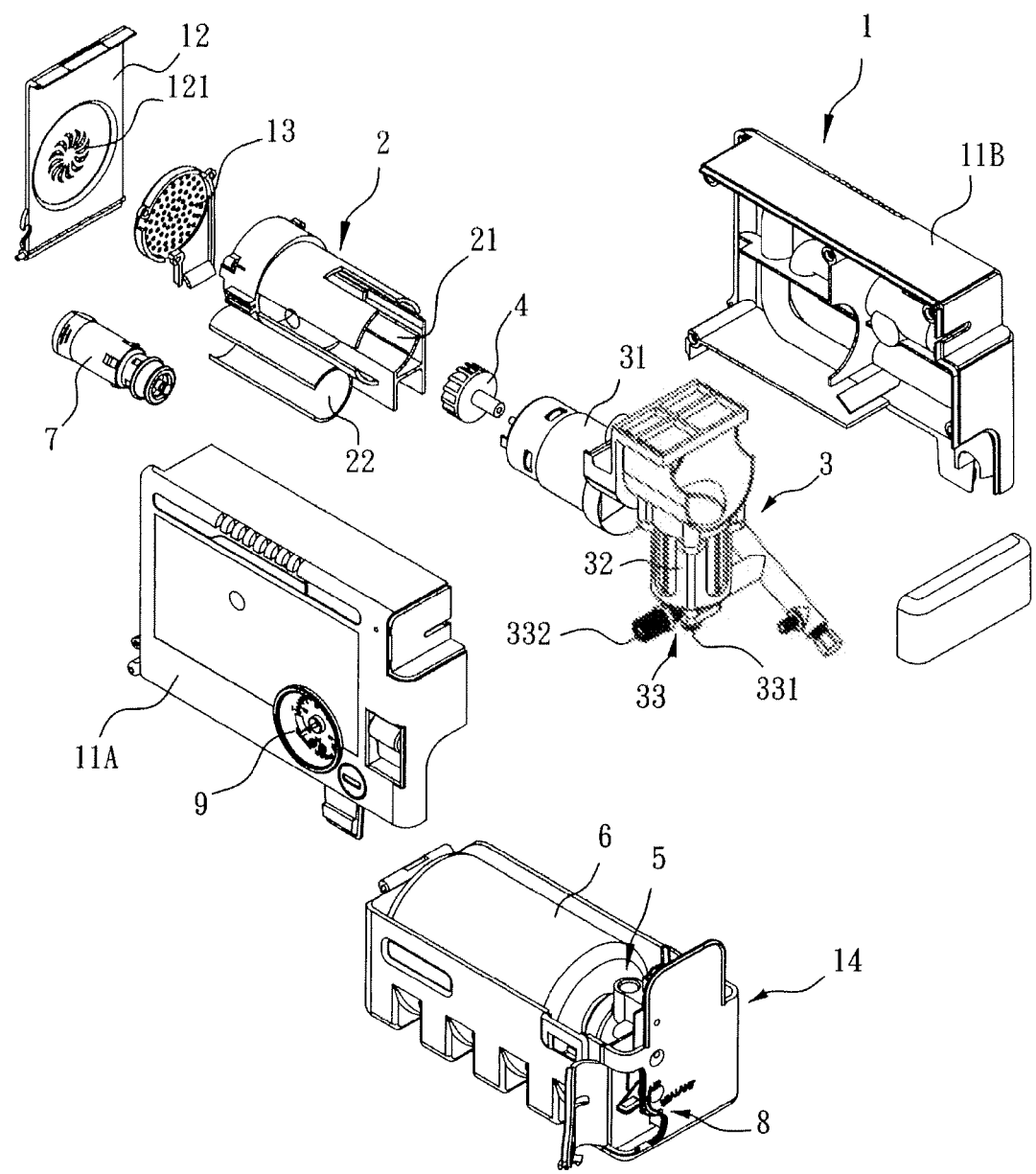
FIG. 2 is an exploded view illustrating the combination relation of the main components of the present invention.
Figure 3:
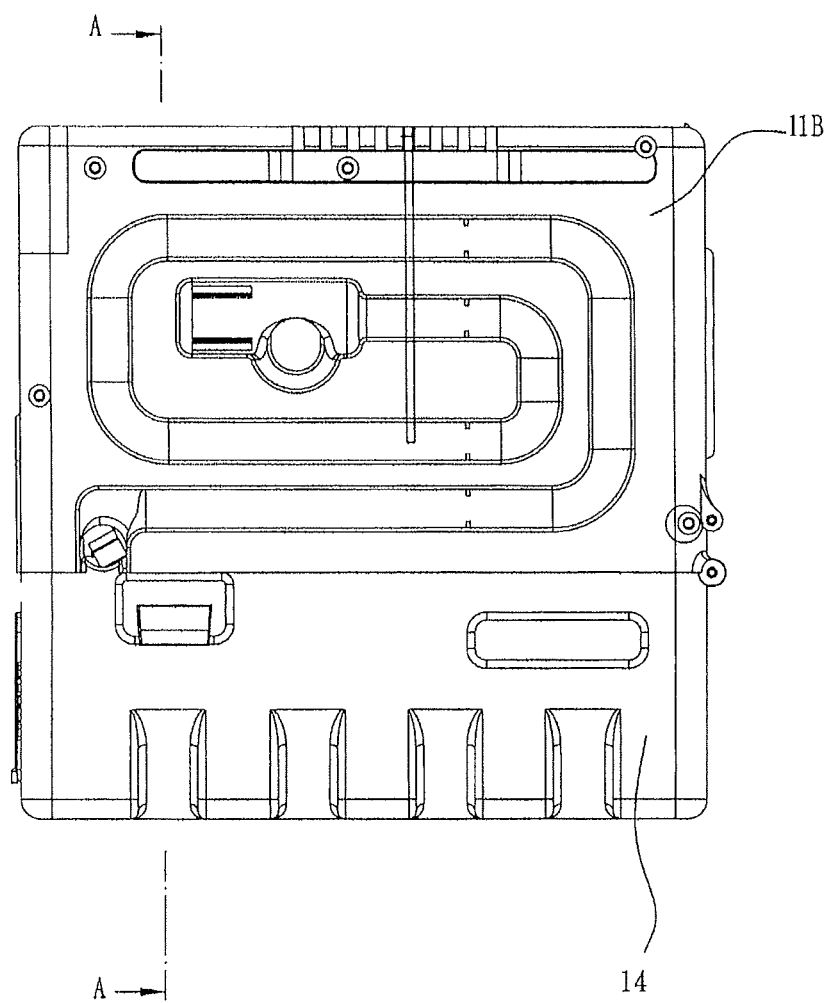
FIG. 3 is a plan view illustrating an embodiment of the side structure of the present invention.
Figure 4:
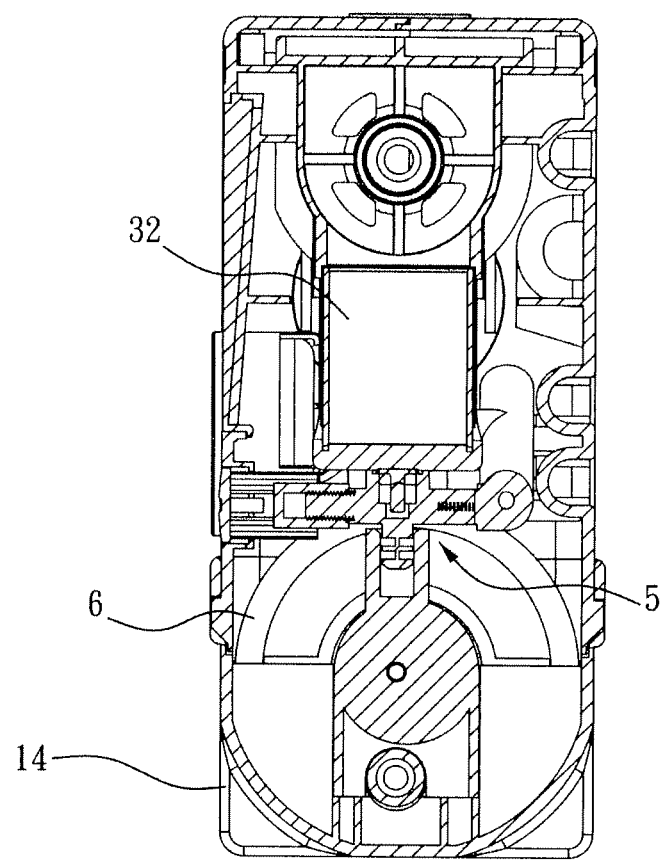
FIG. 4 is a sectional view taken on the section line in FIG. 3 looking in the direction of the arrows A-A.

As shown in FIGS. 2, 3 and 4, in a preferred embodiment, the heat dissipation structure according to the present invention comprises a body 1 composed of a first upper housing 11A, a second upper housing 11B and a base 14. Wherein, the base 14 is used for accommodating a sizing barrel 6 and a joint base connected with the outlet of the sizing barrel 6. The first upper housing 11A combined with the second upper housing 11B are provided above the base 14, and an inner room formed by the first upper housing 11A together with the second upper housing 11B is used for accommodating a positioning pedestal 2, a gas supply unit 3 and a centrifugal fan 4. The gas supply unit 3 further comprises a motor 31 and an air compressor 32. The air compressor 32 is connected with a gas distribution head 33 which has a first outlet 331 and a second outlet 332. The first outlet 331 and the second outlet 332 are respectively connected with the joint base 5 and a pressure gauge 9 through tubes. The joint base 5 has two gas output holes, which gas output hole selected for passing through the high pressure air is controlled by the switch valve 8. The motor 31 which is energized by electrical power can drive the air compressor 32 during operation to generate the high pressure air. The high pressure air can flow out from the first outlet 331 and the second outlet 332 simultaneously; as such the pressure value can be read on the pressure gauge 9. Then the high pressure air is transported to the joint base 5. By operating the switch valve 8, a user can control whether the high pressure air is transported to inflate the object to be inflated directly, or the high pressure air is transported into the sizing barrel 6, so as to push the sizing in the sizing barrel 6 to output for repairing the tire.

Figure 5:
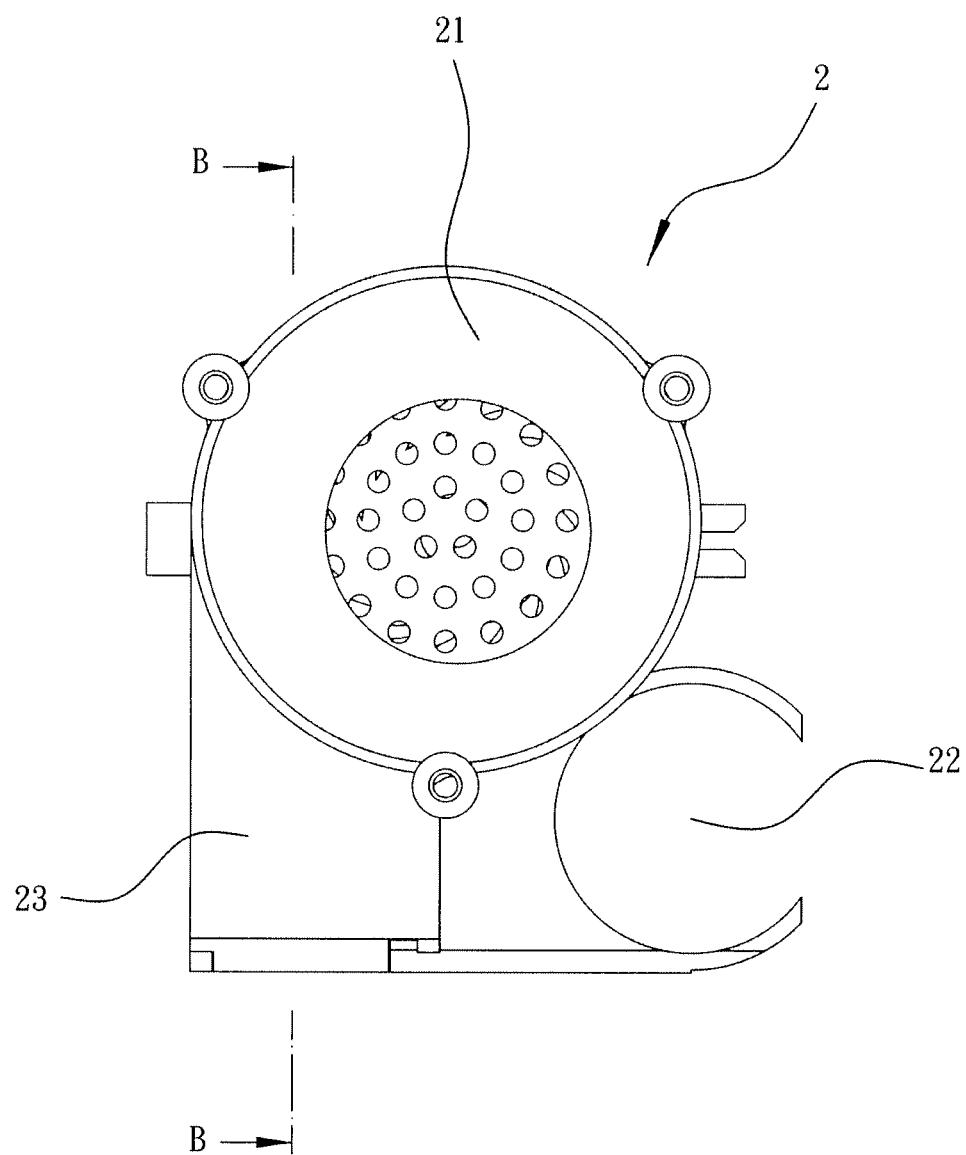
FIG. 5 is a plan view illustrating an embodiment of the structure of the positioning pedestal of the present invention.
Figure 6:
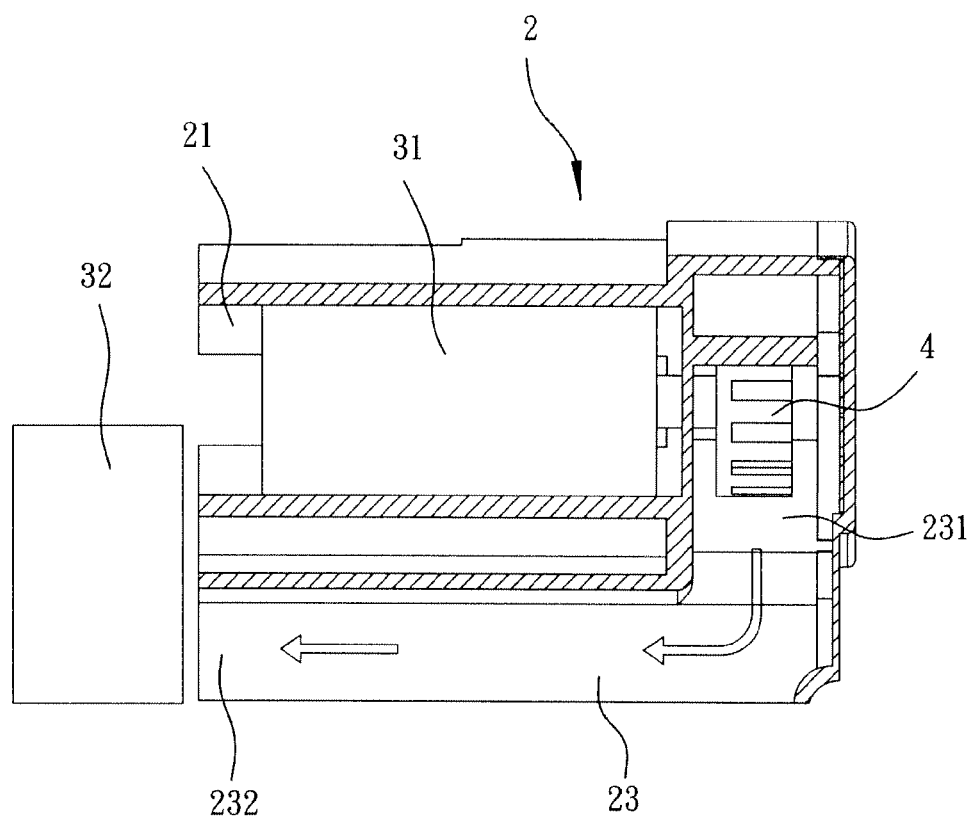
FIG. 6 is a sectional view taken on the section line in FIG. 5 looking in the direction of the arrows B-B.

As shown in FIGS. 2, 5 and 6, in a preferred embodiment, the positioning pedestal 2 of the present invention comprises a first inner room 21 and a second inner room 22 adjacent to each other. A channel 23 is provided below the first inner room 21. One end of the channel 23 is connected to a channel inlet 231 of the first inner room 21, and the opposite end is connected to a channel outlet 232 outside the positioning pedestal 2. After the drive shaft of the motor 31 of the gas supply unit 3 is provided with the centrifugal fan 4, it is arranged in the first inner room 21, wherein, the radial sides of the centrifugal fan 4 are corresponding to the position of the channel inlet 231, while the air compressor 32 is corresponding to the position of the channel outlet 232. The first upper housing 11A together with the second upper housing 11B constitute the upper portion of the body 1. Furthermore, a filter 13 and a tailgate 12 with ventilation holes are provided at the rear end of the body 1. The lower edge of the tailgate 12 is movably relative to the two sides in a pivoting manner, and is combined with the first upper housing 11A and the second upper housing 11B. The second inner room 22 of the positioning pedestal 2 is provided for accommodating and positioning an inflation nozzle 7 which may be provided in a gas supply tube (not shown in the figures). When the inflation nozzle 7 is taken out from the second inner room 22, it can be used to implement an air inflation or a sizing injection to the object to be inflated. When the user plans to implement the air inflation or the sizing injection, it is needed to open the tailgate 12 firstly, take out the inflation nozzle 7 from the second inner room 22 of the positioning pedestal 2, and then implement the air inflation or the sizing injection according to a predetermined operational program. As the switch valve 8 and the operational program for the air inflation or the sizing injection go beyond the scope of the present invention, herein they will not be described in details.

During the operation of the present invention, when the motor 32 is running, it can directly drive the centrifugal fan 4 to rotate. Such that, air can be sucked in from the ventilation hole 121 of the tailgate 12. After the air passes through the filter 13, it is leaded into the channel 23 through the channel inlet 231 by means of the wind-force produced by the radial sides of the centrifugal fan 4, and then the air can flow out from the channel outlet 232 to blow the air compressor 32, so as to dissipate the heat produced by the air compressor 32. In the air convection state, the airflow is also operable to dissipate the heat produced by the motor 31. That is, just one centrifugal fan 4 can be used to dissipate the heat produced by both the motor 31 and the air compressor 32. As the quantity of the fans for heat dissipation is reduced, the product can be designed to be more exquisite, and the manufacturing cost is reduced.

The preferred embodiments mentioned above are only intended to illustrate the present invention. Instead, they are not intended to limit the present invention in any form. Therefore, any modifications or alternations related to the present invention should be included in the scope of present invention, as long as they are made within the spirit of the present invention.

The invention claimed is:

1. A heat dissipation structure of tire repair machine, comprising:

A body having a single ventilation intake hole;

a separate positioning pedestal arranged inside the body, wherein the separate positioning pedestal is provided with a first inner room and a channel, wherein a channel inlet and a channel outlet are provided at the two ends of the channel respectively, and the channel inlet is connected to the first inner room; and wherein the channel is a linear channel extending along a lengthwise dimension of the first inner room; and a gas supply unit arranged driven inside the body, wherein, the gas supply unit comprises a motor; and an air compressor driven by the motor, wherein the motor is arranged inside the first inner room, and its drive shaft is provided with a centrifugal fan, wherein the axial direction of the centrifugal fan is directed to the channel inlet, and the air compressor is positioned corresponding to the channel outlet and outside the first inner room, wherein the centrifugal fan is positioned such that its radial sides are adjacent to the channel inlet;

an inflation nozzle, wherein the inflation nozzle is configured to operably connect to the air compressor for use in inflating a tire;

wherein the separate positioning pedestal further comprises a second inner room, and the second inner room is provided for accommodating and positioning the inflation nozzle.

2. The heat dissipation structure of tire repair machine of claim 1, wherein, the ventilation hole is provided on a tailgate, which is provided at the rear end of the body; a filter is provided between the tailgate and the separate positioning pedestal.

3. The heat dissipation structure of tire repair machine of claim 1, wherein, the motor of the gas supply unit is horizontally arranged, and the air compressor is vertically arranged.

4. The heat dissipation structure of tire repair machine of claim 1, wherein the separate positioning pedestal is arranged inside the body such that the channel is positioned below the first inner room, and wherein the air compressor is positioned below the motor and adjacent the channel outlet so as to maximize air flow to the air compressor via the channel outlet.

5. The heat dissipation structure of tire repair machine of claim 1, further comprising a sizing barrel, the sizing barrel positioned in the body, the sizing barrel configured to operatively connect between the air compressor and an inflation nozzle for use in repairing a tire.

6. The heat dissipation structure of tire repair machine of claim 5, wherein the sizing barrel is positioned in a base of the body.

* * * * *